United States Patent Office 3,536,499
Patented Oct. 27, 1970

3,536,499
FROZEN FOOD PRODUCT AND METHOD OF
PREPARING THE SAME
Charles F. Oberlin, Pulaski, Ohio
(R.F.D. 2, Bryan, Ohio 43506)
No Drawing. Continuation-in-part of application Ser. No. 531,363, Mar. 3, 1966. This application Aug. 25, 1969, Ser. No. 852,872
Int. Cl. A23b 1/06; A22c 21/00
U.S. Cl. 99—108
2 Claims

ABSTRACT OF THE DISCLOSURE

A frozen uncooked poultry meat pattie comprising a mixture of (1) coarsely ground lean breast and/or thigh meat, which is ground with an aqueous solution of seasoning, and
(2) finely ground skin and/or the other meat of the poultry including rib meat, fat and giblets, which is ground with a vegetable fat to coat these finely ground particles and reduce their rancidity, and also ground with a cereal filler such as bread crumbs, which pattie is coated with a sealer such as evaporated milk and breaded, and then packaged and frozen.

RELATED APPLICATIONS

This is a continuation-in-part of Charles F. Oberlin U.S. patent application Ser. No. 531,363 filed Mar. 3, 1966 for "Frozen Food Product and Method of Preparing the Same" and now abandoned.

SUMMARY OF THE INVENTION

Generally speaking, the product of this invention comprises by weight:

(a) Between about 50% and 80% of coarsely ground lean breast and thigh poultry meat particles,
(b) Between about 5% and 15% of finely ground skin and other meat of the poultry such as rib meat, fat and giblets,
(c) Between about 5% and 15% by weight of water including ice particles in which is dissolved,
(d) Between about 1% to 2% of seasoning such as salt, sugar, monosodium glutamate, onion powder or dehydrated onions, and/or celery salt, etc., at least half of which is usually mixed with the coarsely ground breast and thigh meat so as to penetrate this meat to improve its flavor,
(e) Between about 2% and 15% by weight of a vegetable fat such as vegetable oil and/or margarine for sealing the particules to prevent rancidity and is preferably ground together with the finely ground poultry skin and meat particles,
(f) Between about 1% and 10% of cereal crumbs, whole wheat crumbs, wheat germ, cornflake crumbs, and/or the like to prevent stickiness between the particles, and of the final patties, at least part of which cereal crumbs are ground together with the fine meat particles and vegetable fat, and
(g) Between about 1% and 10% of milk such as evaporated milk as a binder for the final cornflake crumb coating of the pattie.

The above ingredients are prepared and mixed at a temperature between about 32° and 40° F. and preferably below 35° F. If the product comprises skin, wing and rib meat, poultry fat and/or giblets, such may be ground in two stages, such as by first coarsely grinding the skin and the other meat together with the vegetable fat and bread crumbs and may be some of the seasoning through a coarse grinder plate with between ¾" and 1" holes and then regrinding through a finer plate having about ⅛" holes. The coarsely ground meat products such as breast and thighs of the poultry are only coarsely ground in the presence of an aqueous solution of at least part of the seasoning so that the flavor will penetrate the large meat products more thoroughly to improve its flavor. The coarse grinding is through a plate containing holes between about ¾" and 1" in diameter.

The two resulting finely and coarse ground meat products are then mixed together in a mixer until they have a uniform consistency, but are not forced through a grinding plate so as not to further break down the larger meat particles.

After this final mixing and while the product is still being mantained at preferably a temperature of about 35° F., it is pressed into patties, which are sprayed with and/or dipped into the milk, dropped onto a conveyor belt covered with cornflake crumbs and then covered with cornflake crumbs. The patties and excess crumbs are then separated and placed into cartons and frozen at such a rate so as to avoid cracking and breaking of the evaporated outer milk layer or sealer. The thus frozen patties may then be taken from the freezer and heated or cooked in any number of ways for direct consumption.

OBJECTS OF THE INVENTION

An object of the present invention is to produce a frozen uncooked poultry pattie that is juicy and flavorful and contains large chunks of breast and/or thigh meat, which pattie may be cooked in a variety of ways for direct consumption.

Another object of the invention is to produce such a pattie in which the particles therein are sealed and maintained at a low temperature to prevent rancidity, and to maintain good flavor and odor.

DETAILED DESCRIPTION OF A PREFERRED EMBODIMENT

Example I

A specific formula for a frozen poultry pattie according to this invention, which has been found to provide a very satisfactory product, comprised: 100 pounds uncooked poultry meat from which the skin, wing and rib meat and giblets were finely ground at about 35° F. to a particle size of less than about ⅛". Separately 30 pounds of ice, 15 pounds of margarine, 10 pounds of bread crumbs, and 2 pounds seasoning, comprising 1 pound of salt, ⅔ pound each of sugar and sodium glutamate, and ⅒ pound each of onion powder and celery salt were ground together at about 35° F. to a particle size of less than about ¼". This mixture was then combined with the first mixture, and the remaining portion of the original 100 pounds of poultry meats comprising breast and thigh meat was coarsely ground at about 35° F. to a particle size between about ¼" and ¾" and mixed with the combined first two mixtures and then formed into patties about ½" thick in a pattie making machine. The resulting patties were then dipped by a conveyor into a solution containing 18 pounds of evaporated milk as a sealer, and then turned over and lightly coated with cornflake crumbs on both sides, packaged, and frozen in the packages for storage and shipment. These patties could be cooked for consumption for about 15 to 20 minutes at about 425° F. by frying, baking, broiling or grilling without breaking a part or losing any moisture or flavor.

Example II

Another formula for a frozen turkey pattie according to this invention comprised: 600 pounds of frozen breast meat of turkey without skin shaved from 40 pound blocks into shavings about ¼" thick, and then mixed with an aqueous solution of seasoning and ground to a chunk size of about 1" by forcing it through a chopper plate having holes of corresponding size. The seasoning solution added to these chunks during the mixing and grinding comprised about 25 pounds of ice cold water in which was dissolved about 13 pounds of a yellowish powder containing salt, monosodium glutamate, sugar and flavoring, and also not more than about 2% by weight of tricalcium phosphate to prevent caking of the powder before it was dissolved in the water. Separately 50 pounds of turkey skin, 50 pounds of rib and wing meat, 35 pounds of margarine, 2 pounds of the yellow seasoning powder mentioned in the paragraph above, and about 10 pounds of bread crumbs were ground to a particle size of about ¾" by being passed through a chopper plate with holes of that size, and then it was reground by passing it through a chopper plate with holes about 3/16". The vegetable fat thus coated the skin particles to reduce any rancidity, and the bread crumbs were to absorb any excess moisture.

These two separately ground batches were then mixed together until they had a uniform consistency and then pressed into patties, coated, breaded, packaged and frozen as in Example I above. Throughout this process the temperature of the particles and product were maintained below about 35° F.

What is claimed is:
1. A process for preparing a frozen meat pattie at a temperature between about 32° and 40° F. comprising the steps of:
   (a) grinding all the lean breast and/or thigh meat to a particle size between about ¾" and 1" in the presence of an aqueous solution of seasoning to improve the penetration of flavor into said particles of meat,
   (b) separately grinding the poultry skin and/or the remainder of the poultry meat to a particle size of about ⅛" in the presence of a vegetable fat to coat these particles to reduce their rancidity and in the presence of bread crumbs,
   (c) mixing the two ground products from (a) and (b) above,
   (d) pressing the resulting mixture into patties,
   (e) dipping said patties in a milk solution,
   (f) coating said dipped patties with cereal crumbs,
   (g) packaging the patties, and
   (h) freezing the patties in said packages.

2. A frozen raw poultry meat pattie manufactured at a temperature between about 32° and 40° F. and prepared by the process of claim 1 comprising:
   (A) a coarsely ground meat part comprising:
      (a) between about 50% and 80% by weight of ground meat selected from the group consisting of lean breast and thigh meat ground to a particle size of between about ¾" and 1".
      (b) between about 5% and 15% by weight of water, and
      (c) between about 1% and 2% by weight of seasoning,
   (B) a finely ground meat part comprising:
      (a) between about 5% and 15% by weight of skin and the outer poultry meat selected from the group consisting of wings, rib, fat, and giblets ground to a particle size between about ⅛" and ¼",
      (b) between about 2% and 15% by weight of a vegetable fat, and
      (c) between about 1% and 15% by weight of cereal crumbs, and
   (C) a sealer coating of between about 1% and 10% by weight of evaporated milk, which coating is covered with some of said cereal crumbs.

References Cited
UNITED STATES PATENTS

| | | | |
|---|---|---|---|
| 2,440,168 | 4/1948 | Cross | 99—108 |
| 2,650,167 | 8/1953 | Garland | 99—194 |
| 2,798,814 | 7/1957 | Rivoche | 99—194 X |
| 2,952,552 | 9/1960 | Ansel | 99—109 X |
| 3,078,172 | 2/1963 | Libby | 99—108 X |
| 3,083,108 | 3/1963 | Kline et al. | |
| 3,309,204 | 3/1967 | Helmer et al. | 99—109 |

FOREIGN PATENTS

| | | |
|---|---|---|
| 688,286 | 6/1964 | Canada. |

JOSEPH M. GOLIAN, Primary Examiner

U.S. Cl. X.R.

99—194

(O 83/1.1)

PO-1050
(5/69)

UNITED STATES PATENT OFFICE
CERTIFICATE OF CORRECTION

Patent No. 3,536,499  Dated Oct. 27, 1970

Inventor(s) Charles F. OBERLIN

It is certified that error appears in the above-identified patent and that said Letters Patent are hereby corrected as shown below:

Column 2, line 66, "a part" should read -- apart --; Column 3, line 28, in claim 1, after "frozen" insert -- poultry --; Column 4, line 17, in claim 2, "outer" should read -- other --; line 32 in References cited, "Garland" should read -- Garsaud -- .

SIGNED AND
SEALED
MAR 2 1971

(SEAL)
Attest:

Edward M. Fletcher, Jr.
Attesting Officer

WILLIAM E. SCHUYLER, JR.
Commissioner of Patents